(12) United States Patent
Carpena et al.

(10) Patent No.: US 6,624,339 B1
(45) Date of Patent: Sep. 23, 2003

(54) METHOD TO CONFINE PLUTONIUM IN APATITIC CERAMICS AND PRODUCTS OBTAINED USING SAID PROCESS

(75) Inventors: Joëlle Carpena, Jouques (FR); Laurent Boyer, Rennes (FR); Jean-Louis Lacout, Toulouse (FR)

(73) Assignees: Commissariat a l'Energie Atomique (FR); Compagnie Generale des Matieres Nucleaires (FR)

( * ) Notice: Subject to any disclaimer, the term of this patent is extended or adjusted under 35 U.S.C. 154(b) by 0 days.

(21) Appl. No.: 09/786,894

(22) PCT Filed: Sep. 10, 1999

(86) PCT No.: PCT/FR99/02157

§ 371 (c)(1),
(2), (4) Date: Mar. 9, 2001

(87) PCT Pub. No.: WO00/15546

PCT Pub. Date: Mar. 23, 2000

(30) Foreign Application Priority Data

Sep. 11, 1998 (FR) .............................................. 98 11334

(51) Int. Cl.$^7$ ................................................. G21F 9/00
(52) U.S. Cl. ................................ 588/14; 588/2; 588/15
(58) Field of Search ........................... 588/2, 9, 10, 11, 588/14, 15; 252/638, 640; 210/682; 264/0.5

(56) References Cited

U.S. PATENT DOCUMENTS 5,771,472 A    6/1998 Carpena et al. ................. 588/2
5,926,771 A  * 7/1999 Brown ........................ 210/682
5,981,289 A  * 11/1999 Wright et al. ................ 436/121
5,994,608 A  * 11/1999 Pal et al. ..................... 210/682

FOREIGN PATENT DOCUMENTS

WO      WO 95/02886      1/1995

* cited by examiner

*Primary Examiner*—Steven Bos
*Assistant Examiner*—Anthony Kuhar
(74) *Attorney, Agent, or Firm*—Hayes Soloway P.C.

(57) ABSTRACT

A phosphosilicate apatite useful as a confinement matrix for radioactive waste, and having the formula:

$$M_tCa_xLn_yHf_wPu_{z-w}(PO_4)_{6-u}(SiO_4)_uF_2 \qquad (I)$$

wherein:

M represents an alkaline metal,
Ln represents at least one cation selected from lanthanides, and
t, x, y, z, w and u are such that:
$0 \leq t \leq 1$,
$8 \leq x \leq 10$,
$0 \leq y \leq 1$,
$0 < z \leq 0.5$,
$0 \leq w \leq z$, and
$0 < u \leq y+2z$, and the total number of positive charges provided by the alkaline metal, Ca, Ln, Hf and Pu cations are equal to 20+u is prepared by a sintering-reaction of a mixture of reagent powders, in a neutral or reducing atmosphere, with application of pressure before or during sintering.

21 Claims, No Drawings

METHOD TO CONFINE PLUTONIUM IN APATITIC CERAMICS AND PRODUCTS OBTAINED USING SAID PROCESS

DISCLOSURE

1. Field of the Invention

The present invention relates to a method to confine plutonium in apatitic ceramics and the products obtained using said process.

More specifically, it relates to a method to fix plutonium in atomic form in a ceramic mineral phase providing a durable confinement material.

With the end of the Cold War, the signing of the Nuclear Weapon Non-proliferation Treaty and the discontinuation of nuclear testing, some countries are in possession of a large quantity of plutonium which requires storage.

Plutonium is a radioactive element with a long life (Pu-239: T=24390 years), hence the need to develop extremely stable conditioning matrices. To avoid criticality problems, the matrix must prevent concentration in the form of clusters.

The purpose of this invention is to provide a method for preparing a confinement matrix intended to store plutonium, the durability and long-term stability of which are confirmed by the existence of natural britholites (OKLO "natural" reactor) containing long-life actinides.

2. State of the Related Art

It has already been envisaged to condition radioactive waste in silicate apatites, as described in the document WO-A-95/02886 [1]. In this document; the radioactive waste conditioned may be lanthanides and actinides.

As indicated in this document, the use of phosphosilicate apatite is very advantageous since apatites have the following remarkable properties:

these structures are very chemically and thermally stable in the natural environment. In addition, natural silicate apatites containing actinides have existed for hundreds of millions of years.

Apatites have a very low solubility in water; in addition, their solubility decreases as the temperature increases, which is a positive point for actinide conditioning since their high activity involves an increase in temperature in the matrix containing them.

Apatitic structures are capable of withstanding radioactivity since the irradiation damage incurred is unstable at temperatures above 60° C. Apatites have the property of restructuring at temperatures above 60° C.

Apatitic structures have the very advantageous property of being able to incorporate numerous metallic elements, particularly actinides and lanthanides, in their structure.

Natural apatites may be represented in the following formula:

$$Ca_{10}(PO_4)_6F_2$$

which corresponds to the structure of fluoroapatite. However, in this structure, numerous substitutions may be made, particularly by replacing $Ca^{2+}$ cations by various metallic elements such as lanthanides, actinides and alkaline metals, substituting $PO_4^{3-}$ ions by other anions such as $SiO_4^{4-}$, and also substituting $F^-$ anions by $S^{2-}$, $Cl^-$, $Br^-$, $I^-$ or $OH^-$ anions.

The formulations used in this document take the following form:

$$M-Ca_x Ln_y A_z (PO_4)_u (SiO_4)_{6-u} X$$

where
M=an alkaline metal,
Ln=Y or a lanthanide,
A=an actinide
X=$S^{2-}$, $2F^-$, $2Cl^-$, $2OH^-$, $2Br^-$ or $2I^-$.
$0 \leq t \leq 3$,
$0 < u < 6$,
$0 < x \leq 10$,
$0 \leq y \leq 10$,
$0 < z \leq 7$, and
$y+z>0$ These apatite formulations may comprise many $SiO_4^4$ ions, therefore few $PO_4^{3-}$ ions, and for this reason show poorer "self-curing" against irradiation from α radiation emitted by the Pu. Indeed, phosphate tetrahedrons are more rigid than tetrahedrons formed by silicates.

In addition, the method to manufacture said apatites requires the use of excess $CaF_2$, for example, a 10% excess with reference to the stoichiometric quantity required to obtain the fluorinated apatite, and several calcination steps with intermediate grinding to obtain the fluorinated apatite.

When a dense ceramic is required, the powder obtained is subjected after the calcination steps to sintering, for example hot compression sintering. Therefore, this method requires numerous calcination steps followed by sintering to obtain a dense ceramic.

The present invention specifically relates to new phosphosilicate apatite formulations, suitable for plutonium confinement, and a method to prepare said apatites in dense ceramic form which is easier to use.

DESCRIPTION OF THE INVENTION

In this way, the invention relates to a plutonium confinement block comprising a phosphosilicate apatite matrix containing the plutonium to be confined and any radioactive lanthanides, the plutonium and lanthanides being included in the chemical structure of the phosphosilicate apatite and said apatite complying with the following formula:

$$M_t Ca_x Ln_y Hf_w Pu_{z-w} (PO_4)_{6-u} (SiO_4)_u F_2 \qquad I$$

wherein:
M represents at least one alkaline metal;
Ln represents at least one cation selected from the lanthanides, and
t, x, y, z, w and u are such that:
$0 \leq t \leq 1$,
$8 \leq x \leq 10$,
$0 \leq y \leq 1$,
$0 < z \leq 0.5$,
$0 \leq w < z$, and
$0 < u \leq y+2z$,
and the total number of positive charges provided by the M, Ca, Ln, Hf and Pu cations are equal to (20+u)

According to the invention, in the phosphosilicate apatite in compliance with formula I given above, the quantities of plutonium, and Ln, Hf and M cations may be varied within relatively small limits with reference to the calcium content x of the apatite, which is 8 to 10.

Similarly, on the tetrahedral sites ($PO_4$ and $SiO_4$), it is possible to vary the $SiO_4/PO_4$ ratio. Each substitution has an effect on the physico-chemical properties of the conditioning matrix and it is the specific choice of formulation that gives the matrix specific physico-chemical properties. The $SiO_4$/

$PO_4$ ratio particularly controls the leaching resistance and the irradiation strength. Therefore, it is necessary to adjust said ratio with reference to the quantity of plutonium introduced. For this reason, according to the invention, the quantity of $SiO_4$ cannot exceed the value $y+2z$, which corresponds to the quantities of Ln and Pu cations present in the phosphosilicate apatite.

In the formula I given above, the total number of negative charges is supplied by the $PO_4^{3-}$, $SiO_4^{4-}$ and $F^-$ anions. Said charges are balanced by the M monovalent cation, the Ca divalent cation and the trivalent and tetravalent cations which may be lanthanides, Hf and Pu.

To ensure that the charges are balanced, the quantities t, x, y, w and z are selected according to the quantity $(6-u)$ of the $PO_4^-$ anions and the valence of the Ln, Hf and Pu cations present to obtain neutrality. For this reason, said quantities may or may not be integers.

The alkaline metal used in said apatite may be any alkaline metal. Na and K are selected advantageously for their easy use. The lanthanides may be any lanthanide from La to Gd. They may be radioactive or not. The choice of Ln cation is important since it makes it possible to substitute the apatite with a neutrophage product such as Gd, to reduce criticality risks.

According to the invention, the confinement block may be composed exclusively of phosphosilicate apatite containing Pu, which preferentially, contains no alkaline metal. However, it is also possible to have, around this apatite matrix containing the plutonium to be conditioned, at least one non-active silicate apatite layer and, if applicable, other layers of silicate apatite or not, of different compositions, so as to form appropriate successive barriers between the plutonium and the environment.

Preferentially, the phosphosilicate apatites of the block and/or the most inner layers directly in contact with the plutonium, do not contain any alkaline metal for improved resistance to irradiation damage, and the most outer layers may be selected to withstand attacks from the outer environment. It is possible to use, for one or more layers, the fluoroapatite composition $Ca_{10}(PO_4)_6F_2$ which is particularly resistant.

In addition, the layers are chosen so as to improve the overall mechanical properties.

According to a first embodiment of the invention, the phosphosilicate apatite formulation is such that the number of silicates is equal to the number of Pu in the crystallographic mesh, the apatite comprising no Ln cations. In this case, the phosphosilicate apatite may comply with the following formula:

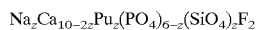   II wherein $0<z\leq0.5$

An example of such a phosphosilicate apatite may comply with the formula:

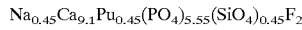   III.

According to a second embodiment of the invention, a phosphosilicate apatite wherein the $PO_4/SiO_4$ ratio is equal to 5 is chosen, and the Ca and Ln cation contents are chosen as a function of the quantity of Pu introduced to meet the phosphosilicate apatite neutrality condition.

In said second embodiment of the invention, the phosphosilicate apatite may comply with the formula:

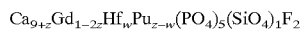   IV where $0<z\leq0.5$ and $0\leq w<z$.

An example of such a phosphosilicate apatite may comply with the formula:

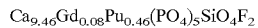   V.

According to a third embodiment of the invention, the phosphosilicate apatite's formulation accounts for criticality criteria which may be controlled by the quantity of an element with a high effective neutron capture cross-section such as gadolinium. In this case, the proportion of Gd introduced is adjusted to the criticality risk and not chosen as a function of the quantity of plutonium, as in the second embodiment of the invention. This particular case of introducing a trivalent element associated with the plutonium will be of particular interest for plutonium of military origin since said plutonium is in the presence of gadolinium. In this case, the phosphosilicate apatite may comply with the formula:

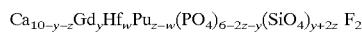   VI where $0<y\leq1$, $0<z\leq0.5$ and $0\leq w<z$.

An example of such a phosphosilicate apatite may comply with the formula:

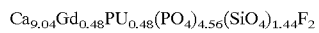   VII.

According to a fourth embodiment of the invention, the phosphosilicate apatite comprises only plutonium and calcium, the Pu substituting the calcium. In this case, the phosphosilicate apatite may comply with the following formula:

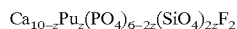   VIII where $0<z\leq0.5$.

An example of such an apatite may comply with the formula:

   IX.

The formula I phosphosilicate apatites used in the invention may be prepared using powder from constituents in oxide, phosphate, carbonate, fluoride, halide, sulphide, hydroxide, or silicate form.

In addition, the invention also relates to a method to prepare a phosphosilicate apatite complying with the following formula:

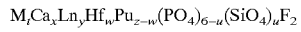   I wherein:

M represents an alkaline metal;

Ln represents at least one cation selected from the lanthanides, and t, x, y, z, w and u are such that:
$0\leq t\leq1$,
$8\leq x\leq10$,
$0\leq y\leq1$,
$0\leq w<z$,
$0<z\leq0.5$, and
$0<u\leq y+2z$, and the total number of positive charges provided by the Na, Ca, Ln, Hf and Pu cations are equal to $(20+u)$, from a mixture of powders comprising the following reagents: plutonium dioxide, calcium pyrophosphate, compounds of the different constituents of the apatite to be prepared and at least one fluorinated reagent, according to which the following steps are carried out:

1) preparation of a first mixture of powders comprising all the reagents except for the fluorinated reagent(s);
2) addition of the first mixture of fluorinated reagent(s) to obtain a final mixture of all the reagents;
3) grinding of the final mixture to a particle size of less than 50 µm;
4) sintering-reaction of the final mixture, at a temperature of 1100 to 1600° C., in a neutral or reducing atmosphere, with application of pressure before or during the sintering.

To implement the method according to the invention, in step 2, quantities of fluorinated reagent(s) corresponding to the stoichiometric proportions required to obtain the formula I phosphosilicate apatite are advantageously used.

In this way, with the method according to the invention, particularly due to the preparation of the powder mixture in two steps, it is possible to obtain a total incorporation of the fluorine during the sintering-reaction step and thus obtain a homogeneous dense ceramic in which the plutonium is immobilised.

According to the invention, β-form calcium pyrophosphate $Ca_2P_2O_7$ obtained by calcining anhydrous or dihydrate calcium hydrogen phosphate ($CaHPO_4$ or $CaHPO_4.2H_2O$) is used, at approximately 1000° C., for 1 to 2 hours, since it is easier to check its purity in this form.

The plutonium is introduced in the form of plutonium oxide which is ground alone to obtain a powder with an average particle size of 2 to 50 µm, e.g. a particle size of approximately 10 µm. This very fine grinding of the plutonium oxide makes it possible to obtain in the final ceramic the most homogeneous distribution of plutonium possible. In addition, the ground quantities prevent criticality from being reached.

After these two powders have been prepared, the reagents are weighed in stoichiometric proportions and all the reagents are mixed with the $PuO_2$ powder by performing steps 1 and 2 of the method according to the invention, to introduce the fluorinated reagent(s) last.

The first step may be performed by mixing all the powder reagents except for the fluorinated reagents such as calcium, gadolinium and/or plutonium fluorides, with the $PuO_2$ powder, in a liquid used as a lubricant and homogeniser such as water, an alcohol or acetone. Other liquids may be suitable provided that they can evaporate and do not leave any residue. The quantity of liquid is such that the mixture of liquids is covered well. Mixing is performed until the liquid, e.g. acetone, has evaporated. Then the residue is placed to dry in an oven at approximately 100° C. to evaporate the acetone completely. The residue is then ground to obtain a powder with a good homogeneity and a particle size less than 50 µm.

When the mixture of powders added to $PuO_2$ comprises calcium carbonate, the first mixture obtained in the first step is subjected to a heat treatment to break down the calcium carbonate before adding the fluorinated reagents. Said heat treatment may consist of heating for 1 to 2 hours at 900° C.

In the second step, the pulverulent fluorinated reagents are added to the powder which has undergone the heat treatment. For this, both powders are mixed, e.g. in acetone (sufficient quantity to cover the mixture) until the acetone evaporates. Subsequently, the reaction mixture is placed in an oven to eliminate the residual acetone at a temperature of not more than 120° C. to prevent any risk of volatility of the fluorinated products.

Step 3) of the method according to the invention, which consists of grinding the powder mixture to particle size of less than 50 µm, is then carried out. Said grinding may be performed in the presence of distilled water by adding, for example, 50% by weight of distilled water to the powder mixture comprising all the reagents. The mixture is then ground in jars in $ZrO_2$ for approximately twenty minutes at a speed of approximately 1100 rpm. After drying in an oven for approximately 2 hours at around one hundred degrees, the powder is sieved to ensure that no particles of over 50 µm are retained.

The fourth sintering-reaction step may be performed in two different ways depending on whether pressure is applied before or during the sintering.

According to a first embodiment of said sintering reaction step, the following steps are performed:

a) compressing the mixture of powders in a mould under pressure from 100 to 500 MPa (1000 to 5000 bar), and b) calcining the compressed product, in a neutral or reducing atmosphere, at atmospheric pressure, at a temperature from 1500 to 1600° C.

In this case, the reagent powder obtained in step 3) is compacted, e.g. in a cylindrical mould of a diameter of approximately ten millimetres, with pressures ranging from 100 to 500 MPa (1000 to 5000 bar).

This compacting is required to improve the reactivity of the powder by placing the particles in contact. Preferentially, the pressure is applied slowly so as not to trap the air and a stabilised phase of 15 minutes, when ⅔ of the final pressure has been reached, may be envisaged. The pellets obtained after compacting are calcined in a tubular furnace enabling operation in a neutral (e.g. nitrogen) or reducing (e.g. a mixture of argon and 5% hydrogen) medium. The calcination is performed at a high temperature (between 1500° C. and 1600° C.) for times ranging from 2 to 20 hours depending on the quantity of plutonium to be incorporated (1 to 10% by weight). The temperature rise and fall rate may vary by 5 to 50° C. per minute depending on the furnace's capacities. The apatite synthesis and sintering are performed in a single step, which limits the volatility of the fluorine, and the high temperatures used make it possible to obtain very homogeneous ceramics.

In this way, said sintering-reaction step makes it possible to obtain a dense ceramic without the need to perform several calcination cycles separated by grinding steps as in document [1], and without ending the treatment with pressurised sintering.

According to a second embodiment of the sintering-reaction step 4), the mixture of powders is sintered in a neutral or reducing atmosphere, at a pressure of 10 to 25 MPa (100 to 250 bar) at a temperature of 1100 to 1500° C.

Said sintering-reaction may be completed if required to improve the homogeneity of the matrix further, by an additional treatment comprising the following steps:

c) grinding of the sintered product obtained, d) compacting of the ground product at a pressure of 100 to 500 MPa (1000 to 5000 bar), and e) annealing heat treatment of the compacted product, at atmospheric pressure, in a neutral or reducing atmosphere, at a temperature of 1200 to 1600° C.

For example, these different steps may be performed as follows.

The reagent powder mixture obtained in step 4) is compacted in a graphite mould at ambient temperature at a pressure of 10 to 30 MPa (100 to 300 bar).

A first temperature stage (between 600° and 800° C.) is reached at a rate of 5 to 50° C./minute without pressure to prevent air trapping. The pressure is only applied at the end of the fifteen-minute stage and up to the end of the final stage (between 1100° C. and 1500° C.). The duration of the stage, during which the pressure is applied, depends on the temperature (between 1 hour and 12 hours) and the quantity of plutonium (1 to 10% by weight).

If necessary, the pellet obtained may then be ground and reformed by compacting at a pressure of 100 to 500 MPa (1000 to 5000 bar). The pellet obtained undergoes a further calcination or annealing to improve the distribution of Pu in the matrix. The annealing, at atmospheric pressure, is performed at a temperature of 1200° C. to 1600° C., in a neutral or reducing atmosphere, for 2 to 20 hours, depending on the temperature. The higher the sintering-reaction temperature, the shorter the annealing time required to obtain a homogeneous apatitic ceramic.

Other characteristics and advantages of the invention will be seen more clearly upon reading the following examples, which are naturally given as an illustration and are not restrictive.

DETAILED DESCRIPTION OF EMBODIMENTS

The following examples illustrate the preparation of phosphosilicate apatites corresponding to four embodiments of the invention.

In all these examples, the method according to the invention is used to prepare said phosphosilicate apatites from the following reagents: $CaF_2$, $SiO_2$, $Ca_2P_2O_7$, $CaCO_3$ and $PuO_2$ with $Na_2CO_3$, $GdF_3$ and/or $Gd_2O_3$, if required.

EXAMPLE 1

Synthesis of a Phosphosilicate Apatite According to the Formula:

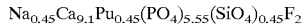

$$Na_{0.45}Ca_{9.1}Pu_{0.45}(PO_4)_{5.55}(SiO_4)_{0.45}F_2 \qquad III.$$

To obtain 10 g of britholite complying with the above formula, a first mixture is first of all prepared in acetone using the following quantities of reagents:

$CaCO_3$: 2.3405 g
$PuO_2$: 1.1307 g
$SiO_2$: 0.2479 g
$Ca_2P_2O_7$: 6.4662 g, and
$Na_2CO_3$: 0.2187 g.

All the reagents, except $CaF_2$, are mixed in acetone and dried in an oven at 100° C. for 1 hour. They are then ground to obtain a particle size of 50 μm and calcined for 1 to 2 hours at 900° C. to break down the carbonates. After cooling, 0.7160 g of $CaF_2$ is added, and the two powders are again mixed in acetone. After the acetone has evaporated completely in an oven at 100° C. (around thirty minutes), grinding is performed with 50% by weight of distilled water in jars in $ZrO_2$ to obtain a powder with a particle size of 10 μm. The reagent powder is then compacted to 400 MPa (4000 bar) with the application of slow and progressive pressure (20 MPa/min; 200 bar/min). This makes it possible to increase the thermal conductivity of the powder and the calcination will be affected. The reaction time for a given temperature and pressure will be decreased.

The pellet obtained is then calcined at 1500° C. for 6 hours in a nitrogen atmosphere. Under these conditions, there is no loss of fluorine due to volatility during the reagent sintering.

EXAMPLE 2

Synthesis of Apatite According to the Formula:

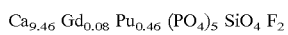

$$Ca_{9.46}Gd_{0.08}Pu_{0.46}(PO_4)_5 SiO_4 F_2 \qquad V.$$

In this case, the same procedure as for example 1 is followed, but the reagents used to prepare the first mixture are present in the following proportions:

$CaCO_3$: 2.7945 g
$PuO_2$: 1.1425 g
$SiO_2$: 0.5446 g
$Ca_2P_2O_7$: 5.7585 g, and
$Na_2CO_3$: 0.4804 g.

After heat treatment to break down the calcium carbonate, 0.7078 g of $CaF_2$ is added and the final mixture of the powders is performed, as in example 1.

A homogeneous dense ceramic containing plutonium and gadolinium is thus obtained.

EXAMPLE 3

Synthesis of Apatite According to the Formula:

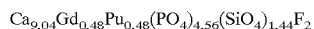

$$Ca_{9.04}Gd_{0.48}Pu_{0.48}(PO_4)_{4.56}(SiO_4)_{1.44}F_2 \qquad VII$$

To obtain 10 g of britholite corresponding to the above formula, the following reagents in the following proportions are used to prepare the first mixture:

$CaCO_3$: 3.0089 g
$PuO_2$: 1.1361 g
$SiO_2$: 0.7474 g
$Ca_2P_2O_7$: 5.0047 g, and
$Gd_2O_3$: 0.7515 g.

All these reagents are mixed in acetone and dried in an oven as in example 1. They are then ground to obtain a particle size of approximately 50 μm and the mixture is heated to 900° C. to break down the carbonates. After cooling, 0.6745 g of $CaF_2$ is added and the final mixture and grinding are performed as in example 1.

The powder obtained is shaped in a carbon mould using a piston and the mould is then heated by induction. A pressure of 25 MPa is then applied at the end of the 15 minute stage at 700° C. and calcination is continued at a temperature of the order of 1100° C. for one hour, applying a pressure of 25 MPa. If the homogeneity of the matrix is not satisfactory, the pellet undergoes fine grinding, followed by annealing at a very high temperature (1600° C.) in a neutral atmosphere without any risk of loss of fluorine.

EXAMPLE 4

Synthesis of Apatite According to the Formula:

$$Ca_{9.55}Pu_{0.45}(PO_4)_{5.1}(SiO_4)_{0.9}F_2 \qquad IX.$$

In this example, the same procedure as in example 3 is followed using the following quantities of reagents:

$CaCO_3$: 3.1481 g
$PuO_2$: 1.1241 g
$SiO_2$: 0.4930 g
$Ca_2P_2O_7$: 5.9073 g, and
$CaF_2$: 0.7118 g.

The product obtained following the pressurised sintering is a dense, homogeneous ceramic wherein all the fluorine is incorporated.

It is to be noted that the improved incorporation of fluorine in the method according to the invention is due to the use of a neutral or reducing atmosphere which does not favour fluorine-oxygen exchanges, and due to the fact that the synthesis and densification are carried out in only one step at a high temperature.

The dense ceramics obtained in this way are more homogeneous since the calcination and/or annealing temperatures are higher. These two improvements made to the method described in document [1] improve the conditioning of plutonium considerably.

In addition to the intrinsic properties offered by the present invention, additional confinement properties are offered in that the products obtained come in the form of dense monoliths, which reduces the exchange surface for leaching.

In addition, according to the invention, it is possible to add a neutrophage product such as Hf or a neutron poison such as Gd in the form of microinclusions or as a substitution to reduce criticality risks.

REFERENCE

[1]: WO-A-95/02886.

What is claimed is:

1. A method for preparing a phosphosilicate apatite having the formula (I):

$$M_tCa_xLn_yHf_wPu_{z-w}(PO_4)_{6-u}(SiO_4)_uF_2 \tag{I}$$

wherein:

M represents an alkaline metal,

Ln represents at least one cation selected from lanthanides, and t, x, y, z, w and u are such that:
$0 \leq t \leq 1$,
$8 \leq x \leq 10$,
$0 \leq y \leq 1$,
$0 < z \leq 0.5$,
$0 \leq w < z$, and
$0 < u \leq y + 2z$, and the total number of positive charges provided by the alkaline metal, $Ca_xLn$, Hf and Pu cations are equal to $20+u$;

said method comprising:

a) preparing a first mixture of powders containing plutonium dioxide, calcium pyrophosphate, a silicone compound and optionally one or more compounds selected from alkaline metal compounds, hafnium compounds and lanthanide compounds;

b) preparing a second mixture of powders by mixing the first mixture of powders with at least one powdered fluorinated reagent;

c) grinding said second mixture of powders to a particle size of less than 50 μm;

d) compressing the ground second mixture of powders in a mould under pressure from 100 to 500 MPa to obtain a compressed product, and e) submitting said compressed product to a sintering-reaction in a neutral or reducing atmosphere, at atmospheric pressure and at a temperature of 1500 to 1600° C. to obtain a sintered product.

2. The method of claim 1, wherein the first mixture of powders comprises calcium carbonate and the method comprises between step a) and step b) an additional step of thermally treating said first mixture of powders in order to decompose said calcium carbonate.

3. The method of claim 1, wherein the preparation of the first mixture of powders comprises the steps of:

mixing the powders containing plutonium dioxide, calcium pyrophosphate, the silicone compound and optionally the compound(s) selected from alkaline metal compounds, hafnium compounds and lanthanide compounds, in acetone, evaporating the acetone to obtain a dry residue, and grinding said dry residue to a particle size of less than 50 μm.

4. The method of claim 1, wherein the preparation of the second mixture of powders comprises the step of:

mixing the first mixture of powders and the powdered fluorinated reagent in acetone, and evaporating the acetone.

5. The method of claim 1, wherein the grinding of the second mixture of powders is performed in water and the method comprises between step b) and step c) an additional step of drying the ground second mixture of powders.

6. The method of claim 1, wherein the fluorinated reagent (s) is added to the first mixture of powders in quantities corresponding to the stoichiometric proportions required to obtain the phosphosilicate apatite according to formula (I).

7. The method of claim 1, wherein the calcium pyrophosphate is a β calcium pyrophosphate obtained by calcining anhydrous or dihydrate calcium hydrogen phosphate at approximately 1000° C.

8. The method of claim 1, wherein the plutonium dioxide is in the form of powder with an average particle size of 2 μm to 50 μm.

9. A method for preparing a phosphosilicate apatite having the formula (I):

$$M_tCa_xLn_yHf_wPu_{z-w}(PO_4)_{6-u}(SiO_4)_uF_2 \tag{I}$$

wherein:

M represents an alkaline metal,

Ln represents at least one cation selected from lanthanides, and t, x, y, z, w and u are such that:
$0 \leq t \leq 1$,
$8 \leq x \leq 10$,
$0 \leq y \leq 1$,
$0 < z \leq 0.5$,
$0 \leq w < z$, and
$0 < u \leq y + 2z$, and the total number of positive charges provided by the alkaline metal, Ca, Ln, Hf and Pu cations are equal to $20+u$;

said method comprising:

a) preparing a first mixture of powders containing plutonium dioxide, calcium pyrophosphate, a silicone compound and optionally one or more compounds selected from alkaline metal compounds, hafnium compounds and lanthanide compounds;

b) preparing a second mixture of powders by mixing the first mixture of powders with at least one powdered fluorinated reagent;

c) grinding said second mixture of powders to a particle size of less than 50 μm;

d) submitting the ground second mixture of powders to a sintering-reaction in a neutral or reducing atmosphere, at a pressure of 10 to 25 MPa and at a temperature of 1100 to 1500° C. to obtain a sintered product.

10. The method of claim 9, which further comprises the steps of:

grinding the sintered product, compressing the ground sintered product at a pressure of 100 to 500 MPa, and submitting the compressed sintered product to an annealing treatment in a neutral or reducing atmosphere, at atmospheric pressure and at a temperature of 1200 to 1600° C.

11. The method of claim 9, wherein the preparation of the first mixture of powders comprises the steps of:

mixing the powders containing plutonium dioxide, calcium pyrophosphate, the silicone compound and optionally the compound(s) selected from alkaline metal compounds, hafnium compounds and lanthanide compounds, in acetone, evaporating the acetone to obtain a dry residue, and grinding said dry residue to a particle size of less than 50 μm.

12. The method of claim 9, wherein the preparation of the second mixture of powders comprises the step of:

mixing the first mixture of powders and the powdered fluorinated reagent in acetone, and evaporating the acetone.

13. The method of claim 9, wherein the grinding of the second mixture of powders is performed in water and the method comprises between step b) and step c) an additional step of drying the ground second mixture of powders.

14. The method of claim 9, wherein the fluorinated reagent(s) is added to the first mixture of powders in quantities corresponding to the stoichiometric proportions required to obtain the phosphosilicate apatite according to formula (I).

15. The method of claim 9, wherein the calcium pyrophosphate is a β calcium pyrophosphate obtained by calcining anhydrous or dihydrate calcium hydrogen phosphate at approximately 1000° C.

16. The method of claim 9, wherein the plutonium dioxide is in the form of powder with an average particle size of 2 μm to 50 μm.

17. A method for preparing a phosphosilicate apatite having the formula (I):

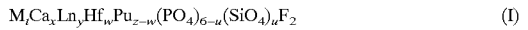

$$M_t Ca_x Ln_y Hf_w Pu_{z-w}(PO_4)_{6-u}(SiO_4)_u F_2 \quad (I)$$

wherein:

M represents an alkaline metal,

Ln represents at least one cation selected from lanthanides, and t, x, y, z, w and u are such that:
0≦t≦1,
8≦x≦10,
0≦y≦1,
0<z≦0.5,
0≦w<z, and
0<u≦y+2z, and the total number of positive charges provided by the alkaline metal, Ca, Ln, Hf and Pu cations are equal to 20+u;

said method comprising:

a) preparing a first mixture of powders containing plutonium dioxide, calcium pyrophosphate, a silicone compound and optionally one or more compounds selected from alkaline metal compounds, hafnium compounds and lanthanide compounds;

b) preparing a second mixture of powders by mixing the first mixture of powders with at least one powdered fluorinated reagent;

c) grinding said second mixture of powders to a particle size of less than 50 μm;

d) submitting the ground second mixture of powders to a sintering-reaction at a temperature of 1100 to 1600° C., in a neutral or reducing atmosphere, with application of pressure before or during the sintering-reaction.

18. A method for preparing a plutonium confinement block, said block comprising a phosphosilicate apatite matrix including the plutonium to be confined, said method comprising the step of preparing a phosphosilicate apatite by the method of claim 17.

19. The method of claim 1, wherein said alkaline metal comprises Na.

20. The method of claim 9, wherein said alkaline metal comprises Na.

21. The method of claim 17, wherein said alkaline metal comprises Na.

* * * * *

UNITED STATES PATENT AND TRADEMARK OFFICE
CERTIFICATE OF CORRECTION

PATENT NO. : 6,624,339 B1
DATED : September 23, 2003
INVENTOR(S) : Carpena et al.

It is certified that error appears in the above-identified patent and that said Letters Patent is hereby corrected as shown below:

Column 9,
Line 39, "$Ca_xLn$" should be -- Ca, Ln --.

Signed and Sealed this

Ninth Day of December, 2003

JAMES E. ROGAN
*Director of the United States Patent and Trademark Office*